Figure 1A:
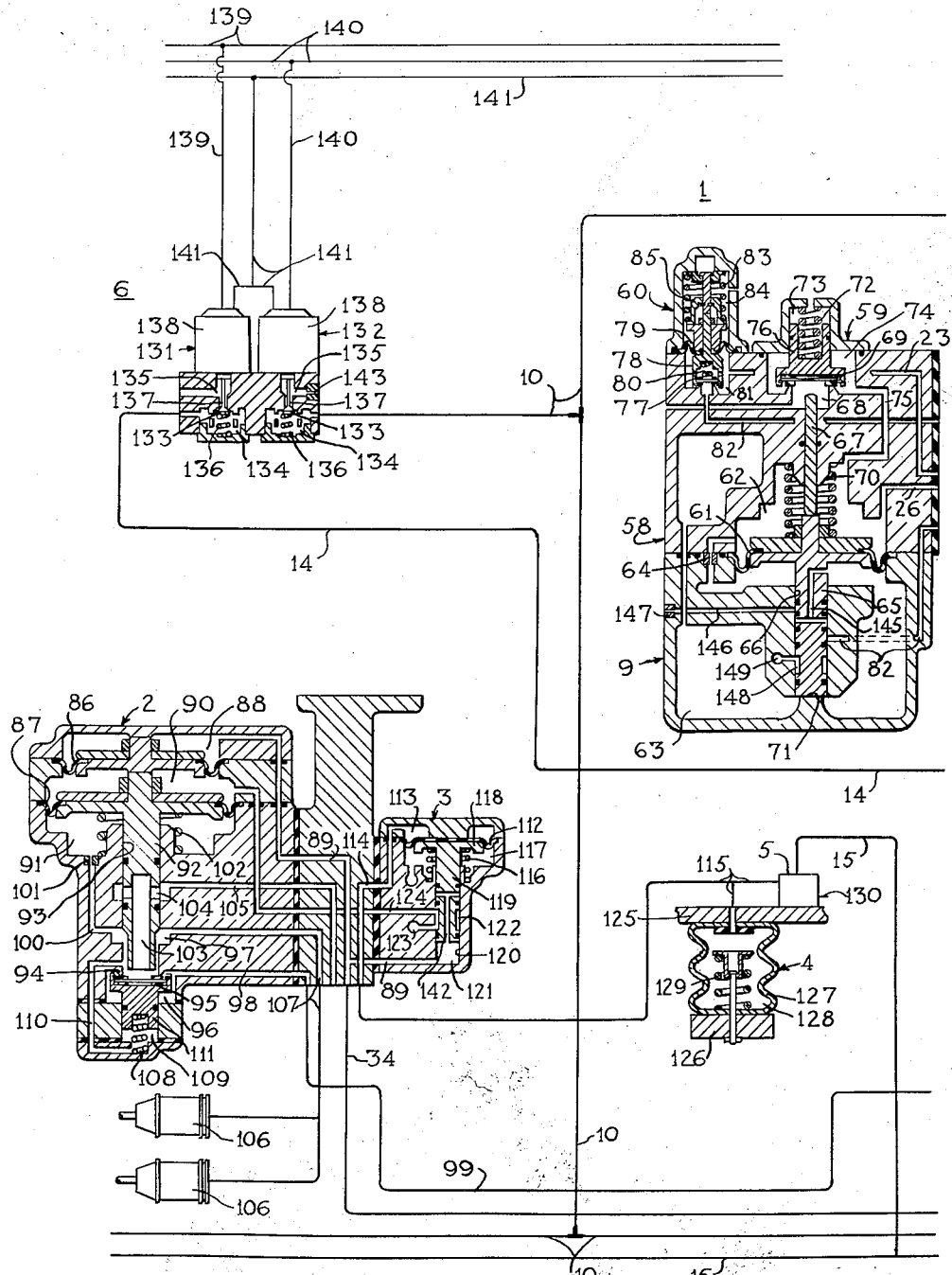

INVENTORS
George L. Cotter
William B. Jeffrey

United States Patent Office 2,919,165
Patented Dec. 29, 1959

2,919,165

LOAD-CONTROLLED FLUID PRESSURE BRAKE APPARATUS

George L. Cotter, Pittsburgh, and William B. Jeffrey, Irwin, Pa., assignors to Westinghouse Air Brake Company, Wilmerding, Pa., a corporation of Pennsylvania Application December 29, 1955, Serial No. 556,308

9 Claims. (Cl. 303—23)

This invention relates to load-controlled fluid pressure brake apparatus for railway cars of the type in which the car body is supported upon an unsprung member by fluid pressure receiving means, such as air springs or the like, and more particularly relates to an improved combined automatic and electro-pneumatic brake apparatus of the above general type embodying novel means for selecting between a full braking ratio or a partial braking ratio according to whether a car is heavily or lightly loaded.

One object of the invention is to provide a relatively low cost load-controlled brake apparatus of the above type adapted to select between a plurality of braking ratios according to load condition of any railway car having a car body supported on an unsprung member by fluid pressure means, the pressure in which varies according to car load.

Another object is to provide a brake apparatus of the above general type especially adapted for use on high-speed low-weight railway passenger cars to provide a full braking ratio or a partial braking ratio on such cars according to the degree of load imposed on the car axle as measured by the fluid pressure required in an air spring or the like to maintain the car body at a preselected constant height above the rails.

Another object is to provide an improved load-controlled brake apparatus for use on a two-axle utility car, to each end of which may be detachably coupled a single-axle car to form a three-car operating unit; said apparatus being provided for controlling braking of the respective axles of the utility car according to whether or not said axles support or do not support a portion of the weight of a dependent single-axle car coupled to said utility car. This arrangement of a utility car and adjacent dependent single-axle cars has been proposed to reduce the cost of passenger trains; the utility car providing steam for heating the adjacent dependent cars and also providing air pressure for operating the air springs on the utility car and said dependent cars.

Another object is to provide, in a graduated application and graduated release type brake apparatus embodying valve means controlled by brake pipe pressure and pressure of fluid in a brake cylinder opposing a normally constant fluid pressure in a control reservoir and operative to increase and decrease brake cylinder pressure according to the extent of reduction and restoration, respectively, of brake pipe pressure relative to control reservoir pressure, a novel arrangement whereby during an emergency application (but not a service application) of brakes, control reservoir pressure is reduced to a chosen value for thereby so limiting the pressure of fluid supplied to the brake cylinder from a supply reservoir (that is constantly charged with fluid at a relatively high pressure from a supply pipe independent of the brake pipe) as to provide a brake cylinder pressure which is proportionate to said chosen value of control reservoir pressure.

Another object is to provide, in an apparatus of the type described in the preceding object, a novel arrangement whereby a quick, electro-pneumatic direct release of a service application of brakes is accomplished by venting control reservoir pressure to a chosen value, for causing a service valve device to promptly move to, and remain in, a brake release position for causing complete venting of fluid under pressure from the brake cylinder.

Another object is to provide, in a brake apparatus of the type described in the two preceding objects, a simplified control reservoir charging control arrangement, whereby during initial charging and also following a quick electro-pneumatic release of a service brake application, the control reservoir will be charged at a rapid rate until pressure therein is substantially equal to the normal full charge value of brake pipe pressure; whereupon control reservoir will be charged at a substantially more restricted rate.

Figure 1B:
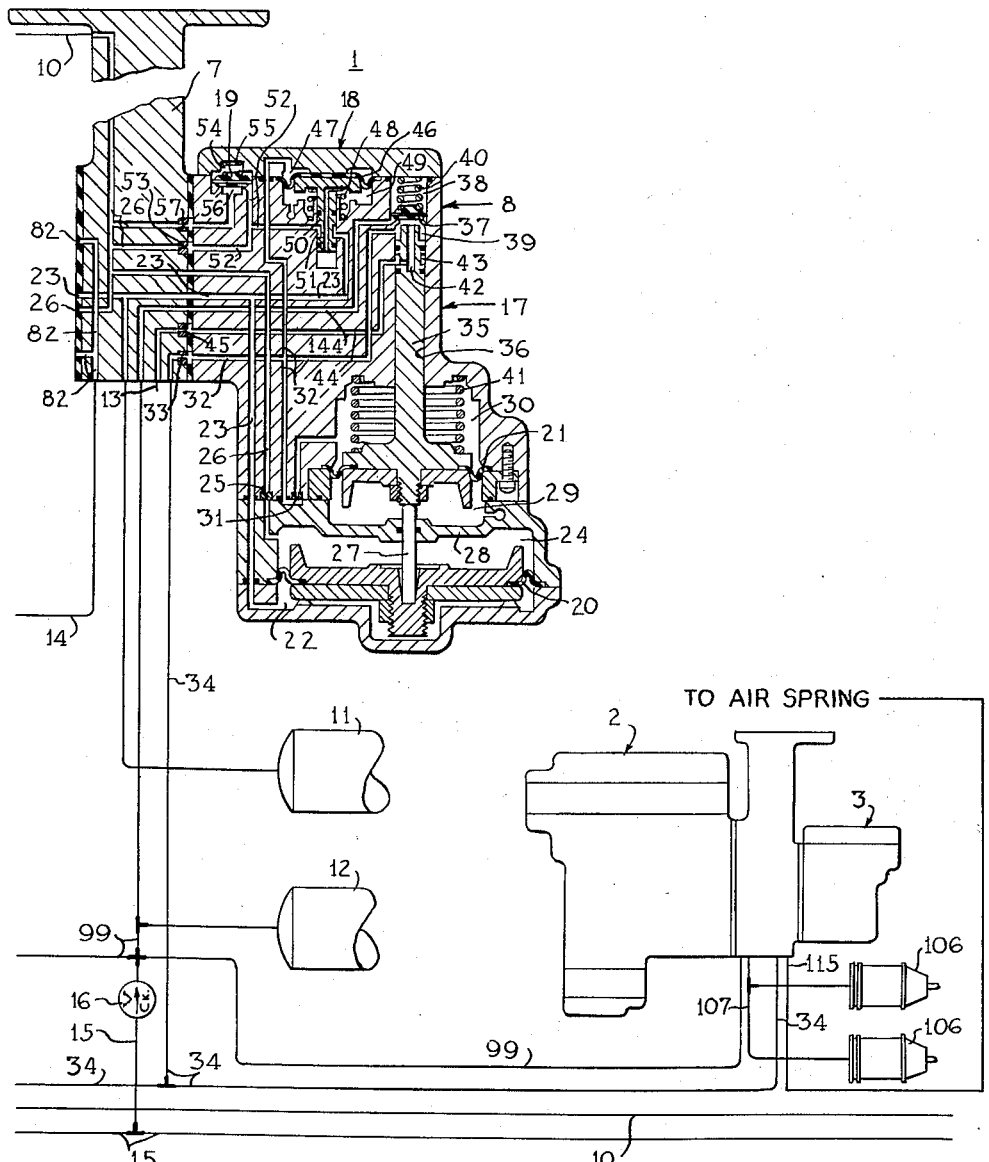
Figure 2:
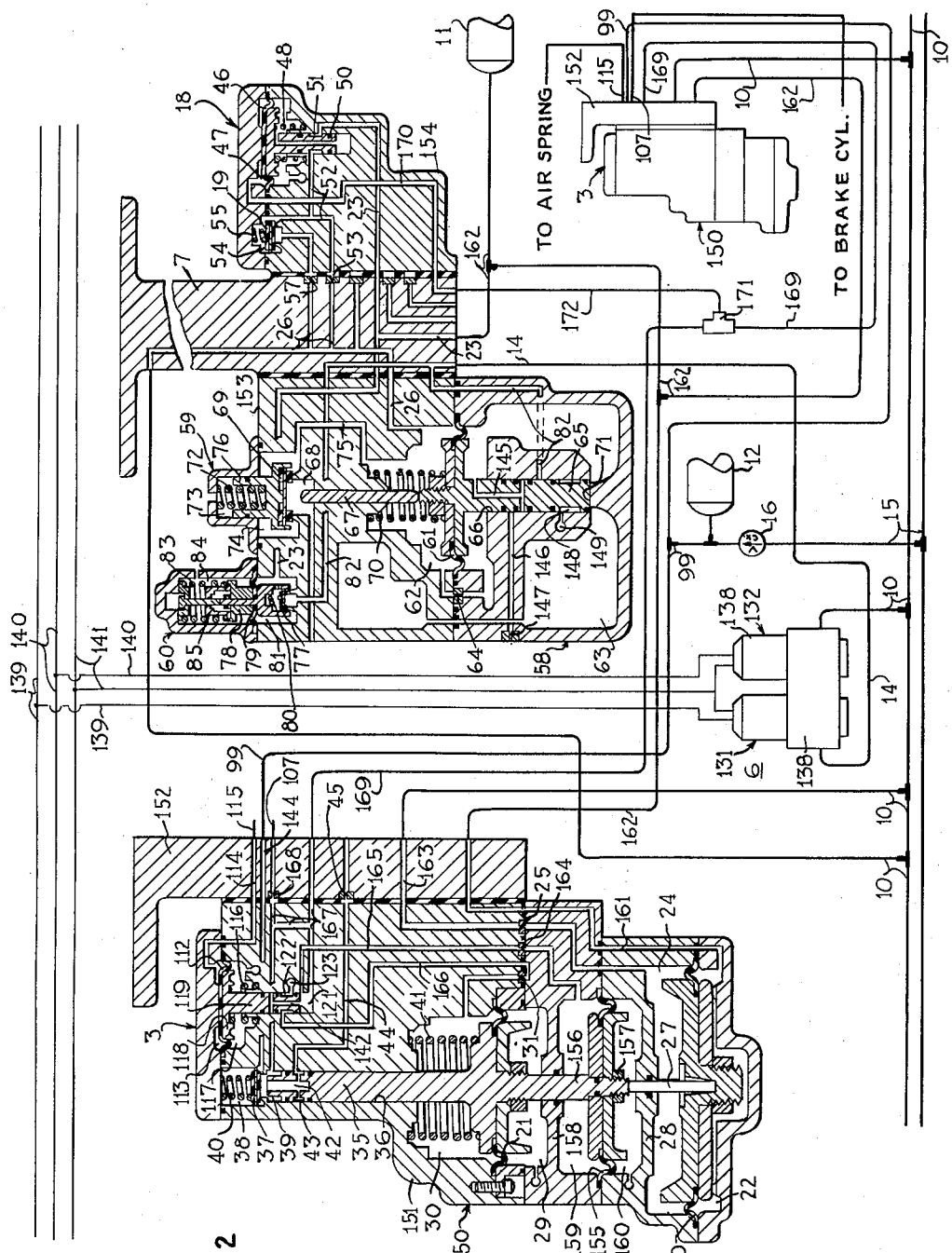

Other objects and advantages will become apparent from the following more detailed description of the invention and from the accompanying drawings, wherein:

Figs. 1A and 1B, when taken together, such that the right-hand edge of Fig. 1A is matched to the left-hand edge of Fig. 1B constitute a diagrammatic view of a brake apparatus embodying the invention; and Fig. 2 is a diagrammatic view of a brake apparatus showing another embodiment of the invention.

*Description—Figs. 1A and 1B*

As shown in these figures of the accompanying drawings, the brake apparatus embodying the invention comprises a brake controlling valve device 1 for each car; a pneumatically controlled relay valve device 2 and a selector valve device 3 for each axle of said car; at least one air spring device 4 for each axle of said car; a control or leveling valve device 5 for so controlling air pressure in each air spring device as to maintain the car body at a preselected constant height above the respective axle; and an application and release magnet valve device 6 for each car.

The brake controlling valve device 1, as improved in accordance with the invention, comprises a pipe bracket 7 on faces of which are mounted a service portion 8 and an emergency portion 9. To the pipe bracket 7 is connected a branch of the usual brake pipe 10 that is adapted to extend from car to car throughout the train and in which pressure of fluid is adapted to be varied in any suitable manner under control of the engineer at the locomotive; and to said pipe bracket are also connected by suitable piping, a control reservoir 11, a supply reservoir 12, a vent pipe 13, and a pipe 14 leading to the device 6. A supply pipe 15 is adapted to extend from car to car through the train and to be charged at the locomotive with fluid at a pressure preferably in excess of the normal operating value of brake pipe pressure, and preferably equal to locomotive main reservoir pressure; a branch of said pipe 15 preferably being connected on each car by way of a non-return check valve 16 to the supply reservoir 12 for preventing depletion of pressure in said reservoir in event of pull apart or uncoupling of the car.

The service portion of valve device 1 comprises a service valve device 17, a charging valve device 18, and a control reservoir charging check valve 19.

The service valve device 17 may comprise two coaxially arranged, spaced apart movable abutments 20, 21 of unequal effective areas, cooperatively but not positively, connected so as to form a stack. The larger movable abutment 20 is subject at its under side, as viewed in the drawing, to pressure of fluid in a chamber 22 that is constantly open via a passage 23 to the control reservoir 11; and said movable abutment is subject to the opposite side to pressure of fluid in a chamber 24 which is constantly open via the usual baffle choke 25 and a brake pipe passage 26 to a branch of the brake pipe 10.

Arranged coaxially with the movable abutment 20 is a cylindrical pusher stem 27 having sealing, slidably guided engagement with the wall of an aligned bore through a casing partition 28 separating the chamber 24 from an atmospheric chamber 29 at the lower side of movable abutment 21; said stem at its respective ends being adapted for abutting engagement with the movable abutments 20, 21. At the opposite side of movable abutment 21 is a chamber 30 that is constantly open by way of a baffle choke 31, a passage 32, and a brake cylinder application control choke 33 to a pipe 34 leading to each relay valve device 2 on a particular car. Coaxially connected to the movable abutment 21 is a cylindrical slide valve 35 having sealing, slidably guided contact with the wall of an aligned bore 36 open to chamber 30. The slide valve 35 at its inner end is adapted to abuttingly engage and unseat a coaxially arranged check valve 37 that controls fluid pressure communication between a chamber 38 and a chamber 39 that is constantly open to a branch of passage 32; said check valve being urged to a seated position by a helical bias spring 40 in chamber 38 for normally preventing flow between said chambers.

A helical bias spring 41 in chamber 30 acts on the movable abutment 21 for urging the stack and hence the slide valve 35 to a brake release position, in which it is shown. With slide valve 35 in this position, chamber 39 and hence passage 32 and pipe 34 are opened to atmosphere via a passageway 42 extending axially from the innermost end of said slide valve and constantly open via a suitable radial port to an elongated annular cavity 43 formed in said slide valve intermediate its ends, which cavity is then in registry with a passage 44 constantly open via a brake cylinder release control choke 45 to the vent pipe 13. And also, in this position, the innermost end of slide valve 35 is disengaged from check valve 37 for permitting the latter to be maintained seated by spring 40.

The charging valve device 18 may comprise a movable abutment 46 subject at one side to pressure of fluid in a chamber 47 constantly open to a branch of passage 32, and subject at the opposite side to pressure of a light helical bias spring 48 in an atmospheric chamber 49. Coaxially connected to the movable abutment 46 is a cylindrical slide valve 50 having sealing, slidably guided engagement with the wall of an aligned bore open to chamber 49. When chamber 47 is substantially devoid of fluid under pressure, the valve 50 will be biased by spring 48 to a charging position, in which it is shown, and in which an elongated annular cavity 51 formed in said valve intermediate its ends connects a branch of passage 23 with a passage 52 that is constantly open via a control reservoir slow charge and overcharge dissipation choke 53 to a branch of brake pipe passage 26.

According to a feature of the invention, the check valve 19 is arranged in a chamber 54 open to a branch of passage 52 and is normally urged by a helical bias spring 55 in said chamber to a seated position for preventing back flow from chamber 54 to a chamber 56 constantly open to a branch of brake pipe passage 26 via a control reservoir fast charge choke 57; said check valve permitting flow in the reverse direction when pressure of fluid in chamber 56 exceeds that in chamber 54 by a preselected small value as determined by the value of spring 55. The choke 57 is of considerably greater flow capacity than the choke 53 for permitting the control reservoir 11 to be charged at a relatively rapid rate by flow past check valve 19 and through cavity 51 of the charging slide valve 50 in charging position until, such as during initial charging, control reservoir pressure is within a few p.s.i. below brake pipe pressure; whereupon spring 55 will seat said check valve and final charging of the control reservoir will be accomplished solely via and at the rate controlled by the slow charge choke 53.

The emergency portion 9 of brake controlling valve device 1 comprises an emergency valve device 58, a brake pipe vent valve device 59, and a protection valve device 60.

The emergency valve device 58 comprises a movable abutment 61 subject at one side to pressure of fluid in a chamber 62 constantly open to a branch of brake pipe passage 26, and subject at the opposite side to pressure of fluid in a quick action chamber 63 that is chargeable with fluid under pressure from the brake pipe at the restricted rate controlled by a charging choke 64 interposed between said chambers. Coaxially connected to the movable abutment 61 is a cylindrical slide valve 65 having sealing, slidably guided contact with the wall of an aligned bore 66 open at both ends to the quick action chamber 63. Arranged coaxially with the movable abutment 61, at the opposite side thereof from the slide valve 65, is a cylindrical pusher stem 67 which has sealing, slidably guided contact with the wall of a bore through a casing partition separating chamber 62 from an atmospheric chamber 68 at one side of a preferably disc-shaped vent valve 69 of vent valve device 59, which vent valve 69 is adapted to be unseated by movable abutment 61 through the medium of said stem.

A helical bias spring 70, arranged in a bore-like recess formed in the end wall of chamber 62, acts on movable abutment 61 for urging the latter and hence slide valve 65 to a normal or release position, in which they are shown, and which position is defined by contact of said slide valve with a stop 71 provided in the end wall of chamber 63. In this position, no fluid pressure connections are established by emergency slide valve 65; and movable abutment 61 exerts no thrust on the pusher stem 67, for thereby permitting vent valve 69 to be held seated by pressure of a helical bias spring 72 in an atmospheric chamber 73.

In valve device 59, the vent valve 69 is contained in a chamber 74 constantly open to the brake pipe 10 via a passage 75 and the chamber 62; said valve being arranged to control fluid pressure communication between said chamber 74 and the atmospheric chamber 68. This vent valve is suitably retained, as by a retaining ring, within a bore-like recess formed in one end of a member 76, adjacent the opposite end of which is a generally cylindrical portion having sealing, slidably guided contact with the wall of a coaxially arranged bore open at its respective ends to the chambers 74, 73. This member 76 is provided for assuring against cocking of the vent valve 69 and also for preventing leakage of fluid under pressure from chamber 74 to atmosphere via the spring chamber 73.

The protection valve device 60 may comprise, briefly, a preferably disc-shaped protection valve 77 which is suitably retained, as by a retaining ring, within a bore-like recess in the lower end of a depending portion of a diaphragm follower assemblage 78 that is suitably clamped about the inner edge of an annular flexible diaphragm 79; said diaphragm being suitably clamped about its outer edge between sections of the casing. A light helical bias spring 80 is suitably arranged in the last mentioned recess for urging the protection valve 77 to a seated position for preventing flow of fluid under pressure from a chamber 81, open to control reservoir passage 23, to a passage 82 leading to the pipe 14. The diaphragm 79 is subject at one side to pressure of fluid in the chamber 81 and at the opposite side to pressure of a helical bias spring 83 arranged in an atmospheric chamber 84 and acting on said diaphragm through the medium of a spring guide 85 and the follower assemblage 78.

According to a feature of the invention, so long as pressure of fluid in the control reservoir 11 and hence in chamber 81 exceeds a chosen value, such as about 20 to 25 p.s.i., as determined by the selected value of spring 83, the diaphragm 79 will maintain the protection valve 77 unseated through the medium of the retaining ring carried by the follower assemblage 78; but when passage 82 is opened to atmosphere via pipe 14 during a quick direct release of brakes or is open to atmosphere via the emergency slide valve 65 during an emergency application of brakes, in the manner hereinafter to be described, the spring 83 will deflect the diaphragm 79 for causing reseating of the protection valve 77, so as to limit the reduction in control reservoir pressure to said chosen value.

According to another feature of the invention, each relay valve device 2 (only one of which is shown in detail) may comprise two coaxially arranged spaced-apart movable abutments 86, 87 of unequal effective areas. At one side of the smaller movable abutment 86 is a chamber 88 that is constantly open via a passage 89 to the pipe 34. At the opposite side of movable abutment 86, and between it and the larger movable abutment 87, is a chamber 90; and at the opposite side of movable abutment 87 is a chamber 91. Coaxially connected to movable abutment 87 is a cylindrical slide valve 92 which has sealing, slidably guided engagement with the wall of an aligned bore 93 open at one end to chamber 91. Surrounding the opposite end of bore 93 is a tapered valve seat 94 for accommodating seating engagement of a coaxially arranged, preferably disc-shaped supply valve 95, that is contained in a chamber 96 and controls fluid pressure communication between chamber 96 and a chamber 97 surrounding a reduced diameter portion of the slide valve 92 at its innermost end. The chamber 96 is constantly open to supply reservoir 12 via a passage 98 and a pipe 99; and the chamber 97 is constantly open to the chamber 91 via a passage 100 and a baffle choke 101.

When the chambers 88 and 90 are devoid of fluid under pressure, a helical bias spring 102 in chamber 91 urges the movable abutment 87 and hence the selector slide valve 92 to a release position, in which they are shown, and in which movable abutment 87 engages one side of movable abutment 86, the opposite side of which engages a stop formed in the end wall of chamber 88. With slide valve 92 in this position, the innermost end of said slide valve is disengaged from the supply valve 95; chamber 97 is vented to atmosphere via a bore-like opening 103 extending axially from said innermost end of the slide valve, a radial port 104 in said slide valve, and an atmospheric vent passage 105 with which said port is then in registry, for thereby venting a pair of brake cylinder devices 106 which are constantly open to chamber 97 via a pipe and passage 107; chamber 91 is vented to atmosphere via choke 101 and the chamber 97; and the supply valve 95 is held seated by pressure of a helical bias spring 108 disposed in a chamber 109 that is constantly open to chamber 97 via a passage 110. The spring 108 acts on the supply valve 95 through the medium of a member 111 comprising a generally cylindrical portion against which said spring seats and which portion has sealing, slidably guided engagement with the wall of a bore connecting the chambers 96, 109; said member 111 also comprising in chamber 96 a portion of larger diameter having a recess within which the supply valve 95 is suitably retained, as by a retaining ring. This member 111 prevents cocking of the supply valve 95 and also prevents leakage of fluid under pressure between the chambers 96 and 109.

According to a feature of the invention, each selector valve device 3 (only one of which is shown in detail) may comprise a flexible diaphragm 112 suitably clamped about its outer edge between sections of the casing, and subject at one side to pressure of fluid in a chamber 113 that is constantly open via a passage 114 to a pipe 115, respective branches of which lead to the air spring device 4 and the control device 5. Diaphragm 112 is subject at the opposite side to pressure of a helical bias spring 116 in an atmospheric chamber 117. The diaphragm 112 is operatively connected through the medium of a diaphragm follower 118 to a preferably integrally formed and coaxially arranged cylindrical slide valve 119 having sealing, slidably guided engagement with the wall of an aligned bore 120; said bore being open at one end to chamber 117 and at the opposite end to a chamber 121 that is defined between the inner end of valve 119 and the base of said bore 120 and is constantly open to a branch of passage 89. An elongated annular cavity 122 formed in slide valve 119 intermediate its ends is adapted to connect an atmospheric vent port 123 with a passage 124 leading to the chamber 90 of relay valve device 2.

Each air spring device 4 (only one of which is shown) is interposed between a sprung member, such as a body 125 of a railway car (or a member rigidly connected to said body), and an unsprung member, such as a non-rotatable wheel-supporting axle 126 (or a member rigidly connected to said axle) for maintaining the car body 125 at a preselected constant height relative to the unsprung member, in the manner to be described.

Each air spring device 4 may comprise a hollow casing 127 consisting of two flat, spaced, coaxially arranged and preferably circular end walls joined to each other by a corrugated or bellows-like axially expandable portion. Each device 4 is so arranged that the end walls of casing 127 are in vertically spaced relation, with the lower end wall engaging a flat horizontal surface on the axle 126 or other unsprung member, while the upper end wall engages a flat horizontal surface on the car body 125 or other sprung member. Contained in casing 127 is a chamber 128 that is chargeable with fluid under pressure from the valve device 5 via a branch of pipe 115. A helical spring 129, suitably retained to limit the extent of its expansion in the direction of the upper end wall of casing 127, is preferably provided in chamber 128 for supporting the car body 125 at a chosen minimum height (less than the aforementioned preselected height) relative to the axle 126 in event of failure of air supply to the chamber 128.

The control or leveling valve device 5 may, for sake of illustration, be of the type disclosed in the copending application of Harry C. May and Joseph F. Frola, U.S. Serial No. 568,113, filed February 27, 1956, and assigned to the assignee of the present invention. This control valve device is mounted on the car body 125 or other sprung member and comprises, briefly, valve means (not shown) operable by suitable linkage (not shown) suitably connected to an unsprung member, such as the axle 126, for supplying fluid under pressure to chamber 128 via a branch of pipe 115 from a branch of supply pipe 15 and releasing fluid under pressure from said chamber via the said branch of pipe 115 and a vent pipe 130, as may be required to establish in chamber 128 different fluid pressures at different times to maintain the car body 125 at the aforementioned preselected height relative to said axle. It therefore follows that the pressure of fluid thus established in chamber 128 is an accurate measure of the load imposed on the axle 126.

The magnet valve device 6 comprises a release magnet valve device 131 and an application magnet valve device 132, both of which may be substantially identical in structure. Each of the devices 131, 132 may comprise a tapered valve 133 arranged in a chamber 134 for controlling release of fluid under pressure from said chamber to a chamber 135 to open to atmosphere; said valve being biased by a helical spring 136 in chamber 134 into engagement with a tapered annular valve seat surrounding a bore connecting said chambers. Slidably mounted in the last mentioned bore and coaxially attached to the valve 133 is a fluted valve stem 137 through the medium of which said valve is adapted to be unseated in response to energization of a magnet 138.

In release magnet valve device 131, chamber 134 is constantly open to the pipe 14, and magnet 138 is adapted to be energized responsively to energization of a release train wire 139. In application magnet valve device 132, chamber 134 is constantly open to a branch of brake pipe 10, and magnet 138 is adapted to be energized responsively to energization of an application train wire 140. The respective magnets 138 of the valve devices 131, 132 are grounded by being connected to respective branches of a return wire 141. The wires 139, 140 and 141 extend from the locomotive and from car to car throughout the train.

The brake apparatus as thus far described is adapted for use on any railway car of the type in which the car body is supported at a preselected constant height above the rails by fluid pressure receiving means, such as the air spring device 4. When so employed, each of these railway cars is provided with one relay valve device 2 and one selector valve device 3 for each axle for controlling the degree of braking of the wheels rotatably mounted on such axle according to the load imposed on such axle, for example, due to variation in passenger or freight load; the apparatus shown in Figs. 1A and 1B being suitable for a passenger or a freight car of the type having an axle at each end thereof. This apparatus is also adapted for use with a two-axle utility car, as described in the objects of the invention; and under such condition, the degree of braking of the wheels associated with a particular axle will be controlled primarily according to whether or not such axle is required to support a part of the weight of an adjacent dependent single-axle car. This apparatus may also be employed on detachable single-axle cars of the type described in the objects of the invention, in which case of course only one relay valve device 2 and selector valve device 3 will be employed; and when so employed, the degree of braking of the single-axle car will be controlled primarily according to whether or not the axle thereof supports a part of the weight of an adjacent single-axle car.

Selective energization and concurrent deenergization of the release and application train wires 139, 140 may, for sake of illustration, be effected by a locomotive brake apparatus of the type shown and described in the co-pending application of George I. Cotter, U.S. Serial No. 549,372, filed November 28, 1955 and assigned to the assignee of the present invention.

This locomotive brake apparatus comprises, briefly, an engineer's brake valve device (not shown) operable by movement of a handle from a running position into an application zone to cause energization of the application train wire 140 until brake pipe pressure at the locomotive has been reduced a degree corresponding to the extent of such movement into said zone, while at the same time maintaining the release train wire 139 deenergized; and operable by movement of said handle from the previously selected setting in the application zone back toward running position to cause concurrent deenergization of the train wires 139 and 140, while at the same time recharging the brake pipe at the locomotive to a degree corresponding to the extent of such movement toward running position, for causing a graduated release of brakes on the attached cars; and operable by movement of said handle from said previously selected setting in the application zone back through running position and to a release position to effect energization of the release train wire 139, while causing application train wire 140 to be deenergized and also supplying of fluid under pressure to the brake pipe at the locomotive for recharging said brake pipe to normal full charge value, for thereby causing a direct release of brakes on the attached cars, as will be understood from subsequent description.

*Operation—Figs. 1A and 1B*

INITIAL CHARGING OF THE BRAKE APPARATUS

With the brake apparatus devoid of fluid under pressure, all components thereof will be in the respective positions in which they are shown in the drawings.

To initially charge the brake apparatus, the engineer moves the handle of the aforementioned engineer's brake valve device to its running position for supplying fluid under pressure to the brake pipe 10 at the locomotive for charging the same to its normal full charge value, while at the same time causing the release and application train wires 139 and 140 to be deenergized.

On a particular car, with these wires 139, 140 and hence the magnets 138 of the release and application magnet valve devices 131, 132 deenergized, the respective valves 133 of these valve devices will be held seated by the respective springs 136 for concurrently closing off the pipe 14 and brake pipe 10 from atmosphere.

Some of the fluid under pressure thus supplied to the brake pipe 10 at the locomotive will flow, on a particular car, via respective branches of brake pipe passage 26 to chamber 24 of service valve device 17, to passage 52 via the control reservoir fast charge choke 57 and past the control reservoir charging check valve 19, and also to passage 52 via the slow charge choke 53. Fluid thus supplied to passage 52 will flow via cavity 51 of charging slide valve 50 in its charging position to passage 23, respective branches of which lead to the control reservoir 11 and to chamber 22 of service valve device 17. Since brake pipe pressure will be supplied to chamber 24 of service valve device 17 at a faster rate than control reservoir pressure is being supplied to chamber 22, the movable abutment stack and hence service slide valve 35 will be maintained in their previously defined brake release positions, in which they are shown, and in which pipe 34 is opened to atmosphere via passage 32, slide valve passageway 42, release passage 44, and choke 45, while check valve 37 is held seated by spring 40 for preventing release of fluid under pressure from supply reservoir 12 to passage 44 and passage 32; it being noted that the supply reservoir 12 will meanwhile be charged with fluid under pressure from the supply pipe 15 past the check valve 16.

Meanwhile, some of the fluid under pressure supplied to brake pipe passage 26 will flow to chamber 62 of emergency valve device 9, with the result that the emergency slide valve 65 will be maintained in its previously defined release position, in which it is shown, because quick action chamber 63 will be charged via chamber 62 at the restricted rate controlled by the charging choke 64. With movable abutment 61 thus in release position, no thrust will be exerted on the pusher stem 67, and hence the vent valve 69 will be maintained seated by pressure of spring 72 for preventing release of fluid under pressure from the brake pipe to atmosphere.

When control reservoir pressure as noted in chamber 81 of protection valve device 60 has increased sufficiently diaphragm 79 will deflect against resistance of spring 83, causing the follower assemblage 78 to carry the protection valve 77 off its seat through the medium of the retaining ring; whereupon control reservoir pressure will equalize via passage 82 into pipe 14, which is then closed off from atmosphere by the seated valve 133 of release magnet valve device 131.

When during the final stage of initial charging, control reservior pressure as noted in passage 52 is within a few p.s.i. of brake pipe pressure as noted in chamber 56, the control reservoir charging check valve 19 will be seated by spring 55 for closing the control reservoir fast charge communication; whereupon the control reservoir 11 will be charged to the normal full charge value of brake pipe pressure solely via and at the rate controlled by the slow charge choke 53, by-passing said check valve.

Assume now that each leveling valve device 5 has operated, in the manner previously described, to provide in chamber 128 of the corresponding air spring device 4 fluid at a pressure sufficient to maintain the car body 125 at the aforementioned preselected height above the corresponding axle 126.

According to a feature of the invention, if a relatively light load is imposed by the car body 125 on the particular axle 126, the leveling valve device 5 will provide in chamber 128 fluid at a pressure less than a chosen value corresponding to the bias effect of spring 116 of selector valve device 3. Under this condition, air spring pressure as noted in chamber 113 of the corresponding valve device 3 will be insufficient to effect compression of spring 116, and consequently the selector slide valve 119 will be biased by said spring to a light load position, defined by contact of diaphragm 112 with a stop formed in the end wall of chamber 113. With selector slide valve 119 in this position, cavity 122 will connect passage 124 to vent port 123 for thereby opening chamber 90 of relay valve device 2 to atmosphere. If, however, a relatively heavy load is imposed by the car body 125 on the corresponding axle 126, the corresponding leveling valve device 5 will provide in air spring chamber 128 and hence in selector valve chamber 113 fluid at a pressure exceeding the aforementioned chosen value (in order to maintain the car body at the aforementioned preselected height above the particular axle 126), with the result that diaphragm 112 of the selector valve device 3 will be deflected against resistance of spring 116 for shifting the selector slide valve 119 to a heavy load position, defined by contact of a depending rim of the follower 118 with the end wall of chamber 117. With slide valve 119 in this position, relay valve chamber 90 will be opened to atmosphere via passage 124, a suitable opening 142 in said slide valve, chamber 121, and pipe 34, which as already noted is then opened to atmosphere via the service valve device 17.

It will now be noted that, throughout initial charging, chamber 90 of relay valve device 2 will be vented to atmosphere via the communications just described, whether or not the corresponding selector slide valve 119 is in its light load position or in its heavy load position; and relay valve chamber 88 will be vented via passage 89 and the vented pipe 34 irrespective of the position of selector slide valve 119. It will also be noted that the bias effect of spring 116 is such, in relation, to the effective area of diaphragm 112, as to differentiate between a light and a heavy load condition on the corresponding axle 126.

With chambers 88 and 90 of relay valve device 2 thus vented, the movable abutment stack and hence the relay slide valve 92 will be maintained by spring 102 in their previously defined release positions, in which they are shown, and in which the corresponding pair of brake cylinder devices 106 is vented via pipe and passage 107, chamber 97, slide valve opening 103 and cavity 104, and vent passage 105.

Thus, at the completion of initial charging, all of the components of the brake apparatus will be in the respective positions in which they are shown in Figs. 1A and 1B of the drawings, with the exception of the protection valve device 60, the valve 77 of which will then be held unseated, as above described.

*Effecting a service application of the brakes*

To effect a service application of brakes, the engineer moves the handle of the aforementioned engineer's brake valve device from running position arcuately into the application zone to a setting within said zone corresponding to the degree of service application desired, thereby causing the application train wire 140 to be energized for effecting a reduction in brake pipe pressure at the locomotive at a service rate and of a chosen degree corresponding to said setting; whereupon said train wire will be deenergized, as more fully described in the aforementioned copending application of George L. Cotter.

On a particular car, the magnet 138 of application magnet valve device 132 will respond to energization of application train wire 140 to unseat the corresponding valve 133 against the light resistance of its spring 136, for thereby locally releasing fluid under pressure from the brake pipe 10 at a service rate by flow past said valve 133 to chamber 135 and thence to atmosphere via a service choke 143, until the application train wire 140 is deenergized at the locomotive, as above described; whereupon valve 133 of application magnet valve device 132 will be reseated by its spring 136 for bottling up fluid in the brake pipe 10 at the desired reduced pressure.

Meanwhile, this reduction in brake pipe pressure will be noted in chamber 24 of service valve device 17 via a branch of brake pipe passage 26, with the result that preponderant control reservoir pressure in chamber 22 will shift the movable abutment stack and hence the service slide valve 35 to a brake application position, in which the inner end of said slide valve sealingly engages the check valve 37 for closing off chamber 39 from release passage 44 and also holding said check valve unseated against resistance of its bias spring 40. With check valve 37 unseated, fluid under pressure will flow from supply reservoir 12 via a passage 144 to chamber 38 and thence past said unseated check valve to chamber 39, whence it will flow via passage 32 to chamber 30 of service valve device 17. When fluid pressure in chamber 30 has increased to a value proportionate to the degree of reduction in brake pipe pressure, as noted in chamber 24, the service stack will be shifted in the direction of chamber 22 for carrying the service slide valve 35 to a lap position, in which check valve 37 is reseated by spring 40 while release passage 44 is maintained cut off from chamber 39, for thereby bottling up fluid in passage 32 at a pressure proportional to the extent of reduction is brake pipe pressure.

It is to be noted that the service valve device 17 is of the differential relay type operative to provide in passage 32 and chamber 30 fluid at a pressure which is a chosen proportion, such as 2.9 times, the extent of reduction in brake pipe pressure, according to the ratio in effective areas of the movable abutments 20, 21.

Meanwhile, some of fluid under pressure thus supplied to passage 32 will flow to chamber 47 of charging valve device 18 for promptly causing the movable abutment 46 to shift against resistance of the light spring 48 and thereby carry the charging slide valve 50 to a cutoff position, in which control reservoir passage 23 is disconnected from passage 52 for preventing back flow of fluid from the control reservoir 11 into the brake pipe via the slow charge choke 53; it being noted that check valve 19 will prevent back flow through the fast charge choke 57.

Some of the fluid thus supplied to passage 32 will also flow via application control choke 33 to pipe 34, and thence via branches of passage 89 to chamber 88 of relay valve device 2 and chamber 121 of selector valve device 3.

If the air spring pressure, as noted in chamber 113 of selector valve device 3, indicates that the load on the corresponding axle 126 is relatively light, the selector slide valve 119 will be biased to its previously defined light load position, in which it is shown, for venting chamber 90 of the corresponding relay valve device 2 to atmosphere. Under this condition, the pressure of fluid supplied to chamber 88 of valve device 2 will be effective to shift the movable abutment stack against resistance of spring 102, for thereby carrying the slide valve 92 to a supply position, in which the inner end of said slide valve sealingly engages the supply valve 95 for preventing release of fluid under pressure from chamber 97 via opening 103 to vent passage 105, said slide valve at the same time holding said suppy valve unseated against resistance of spring 108, for permitting fluid under pressure to flow from supply reservoir 12 via pipe 99 and passage 98, chamber 96 and past the unseated valve 95 to chamber 97 for supply via passage and pipe 107 to the corresponding brake cylinder devices 106. Meanwhile, some of the fluid thus supplied to chamber 97 will flow via passage 100 and baffle choke 101 to chamber 91. When brake cylinder pressure, as thus noted in chamber 91, has increased to a value which is a selected proportion, such as 60 percent, of the pressure of fluid in chamber 88, as determined by the ratio in effective areas of the movable abutments 86, 87, the stack and hence the slide valve 92 will be shifted to a lap position, against resistance of the light spring 102. In this position, the supply valve 95 will be seated by spring 108, and the inner end of said slide valve will sealingly abut said supply valve, for thereby botting up fluid in the brake cylinder devices 106 and in chamber 91 at the aforementioned selected proportion of the pressure in chamber 88.

If, however, air spring pressure as noted in chamber 113 of a particular selector valve device 3 indicates that the load on axle 126 is relatively heavy, then the selector slide valve 119 will be biased by such pressure to its previously defined heavy load position, in which opening 142 connects pipe 34 to relay valve chamber 90. Under this condition, pressure of fluid thus supplied to chamber 90 from pipe 34 will cause movable abutment 87 to be shifted and carry the slide valve 92 successively to its supply position and then to its lap position, when brake cylinder pressure as noted in chamber 91 has increased to a value substantially equal to the pressure in chamber 90 and pipe 34; it being noted that movable abutment 86 will be ineffective and will not move, due to the equality of fluid pressures across its faces.

Meanwhile, in emergency valve device 58, pressure in chamber 62 will reduce uniformly with brake pipe pressure at a service rate; but due to the restricted flow capacity of choke 64, pressure in quick action chamber 63 cannot reduce at said rate. Consequently, when pressure in chamber 63 preponderates slightly over brake pipe pressure in chamber 62, movable abutment 61 will be shifted against resistance of the light spring 70 and thereby carry the emergency slide valve 65 to a service position, in which a passageway 145 in said slide valve registers with a vent passage 146 open at one end to the valve bore 66 and at the opposite end to atmosphere via a breather choke 147. With valve 65 in this position, pressure in quick action chamber 63 will blow down at the same rate and to substantially the same extent as brake pipe pressure, until brake pipe pressure is bottled up at the desired reduced value by deenergization of application train wire 140, in the manner above described; whereupon, pressures in chambers 62 and 63 will equalize via choke 64, causing slide valve 65 to be returned to its release position by spring 70. This blow down of quick action chamber of pressure in the service position of valve 65 assures against undesired movement of said valve to an emergency position, hereinafter to be defined.

*Graduated release of a service application of brakes*

To effect a graduated release of brakes, the engineer moves the handle of the aforementioned engineer's brake valve device from its previously selected setting in the application zone back toward running position for causing the brake pipe 10 to be recharged at the locomotive with fluid at a pressure corresponding to the degree of such handle movement toward running position, while at the same time causing both the application and release train wires 140, 139 to be maintained deenergized. This increase in brake pipe pressure at the locomotive will be noted in chamber 24 of service valve device 17 on a particular car, causing the service stack to shift the service slide valve 35 from lap position to release position, for thereby releasing fluid under pressure from chamber 30 and pipe 34 at the rate controlled by release control choke 45 and to a value corresponding substantially to the extent of increase of brake pipe pressure; whereupon said valve 35 will be returned to lap position.

If, however, the aforementioned handle is moved to running position for restoring brake pipe pressure to its normal full charge value, then the service slide valve 35 will remain in release position and completely vent chamber 30 and pipe 34.

As already noted, chamber 88 of each relay valve device 2 on a particular car is constantly open to pipe 34 and chamber 90 is either open to atmosphere or to pipe 34, according to whether the corresponding selector slide valve 119 is in its previously defined light load or heavy load position, respectively. Hence, when fluid under pressure is released from pipe 34, the relay slide valve 92 will be shifted to its release position, in which it is shown, by fluid pressure in chamber 91 and pressure of spring 102, for thereby releasing fluid under pressure from brake cylinder device 106 and chamber 91 to atmosphere via slide valve opening 103 and passage 105. It will be understood that if pipe 34 is completely vented via service valve device 17, relay slide valve 92 will be maintained in its release position by pressure of spring 102 for maintaining the corresponding brake cylinder devices 106 and chamber 91 open to atmosphere; whereas if fluid pressure in pipe 34 is reduced to a value above atmospheric, as will occur during a graduated release of brakes, the relay slide valve 92 will be shifted to its lap position when brake cylinder pressure has been reduced to a value corresponding to the value of pressure retained in pipe 34.

*Quick direct release of a service application of brakes*

If it is desired to effect a quick direct release of a service application of brakes, the handle of the aforementioned engineer's brake valve device is moved arcuately from a previously selected setting in the application zone back through running position to a release position, for recharging the brake pipe 10 at the locomotive to its normal full charge value and at the same time energizing release train wire 139.

Under this condition, on a particular car, the magnet 138 of release magnet valve device 131 will be energized and effect unseating of the corresponding valve 133, for releasing fluid under pressure from pipe 14 to atmosphere. Fluid under pressure will thereupon be rapidly vented from control reservoir 11 via passage 23, chamber 81, thence past the initially unseated protection valve 77 and through passage 82 and pipe 14, until control reservoir pressure in said chamber 81 has been reduced to the aforementioned chosen value, illustratively assumed as 25 to 20 p.s.i.; whereupon spring 83 will deflect diaphragm 79 and cause protection valve 77 to be seated through the medium of diaphragm follower assemblage 78 and spring 80, for thereby terminating the reduction in control reservoir pressure.

As a result of this prompt reduction in control reservoir pressure, as noted in chamber 22 of service valve device 17, the movable abutment stack thereof will be shifted by the preponderant effect of fluid pressures in chambers 30, 24, for carrying the service slide valve 35 to its brake release position, where it will remain for completely venting chamber 30 and pipe 34 via previously described communication including passageway 42. With pipe 34 vented, each relay valve device 2 on a particular car will operate to completely vent fluid under pressure from the corresponding brake cylinder device 106 and chamber 91, as will be understood from previous description.

When fluid pressure in pipe 34 and hence in chamber 47 of charging valve device 18 has reduced to about 1 p.s.i., spring 48 will shift the charging slide valve 50 to its charging position, in which cavity 51 connects the passages 52 and 23. If control reservoir pressure has been reduced, as during a quick release in the manner just described, the control reservoir 11 will thereupon be recharged from the brake pipe initially at a relatively fast rate by flow through the fast charge choke 57 and past the charging check valve 19, and later solely via the slow charge choke 53; whereas, if brakes were completely released by moving the aforementioned handle from the application zone back to running position—in which case control reservoir pressure will not have been reduced—then control reservoir pressure will equalize with brake pipe pressure via the choke 53.

Hence, whenever a quick release is effected, the handle of the aforementioned engineer's brake valve device should be moved from release position to running position (for deenergizing release train wire 139 to close off pipe 14 from atmosphere) before brake cylinder pressure has been reduced sufficiently to cause the charging slide valve 50 to return to its charging position; otherwise, any fluid supplied from the brake pipe to the control reservoir 11 will be bled off past the protection valve 77 and through pipe 14 to atmosphere.

With the aforementioned handle in running position and the service application of brakes completely released, the various components of the brake apparatus will be conditoned as upon completion of initial charging.

Effecting an emergency application of brakes

To effect an emergency application of brakes, the brake pipe 10 is vented at an emergency rate, such as by operation of the conductor's valve on a car or by movement of the handle of the aforementioned engineer's brake valve device to an emergency position beyond the limit of the application zone.

On a particular car, this emergency rate of reduction in brake pipe pressure will be noted in chamber 62 of emergency valve device 58, with the results that pressure in quick action chamber 63 will shift movable abutment 61 against resistance of spring 70, initially carrying the emergency slide valve 65 to its service position, in which chamber 63 is connected to atmosphere via slide valve passageway 145 and service breather choke 147; but since quick action chamber pressure will thereupon be vented only at the rate equivalent to a service rate of reduction in brake pipe pressure, a pressure differential will build up promptly across the movable abutment 61 sufficient to further shift the latter against resistance of said spring, for thereby carrying said slide valve to an emergency position, defined by contact of said movable abutment with a stop surrounding the spring-accommodating recess in the end wall of chamber 62. Under this condition, the vent valve 69 will be unseated through the medium of pusher stem 67 for locally venting fluid under pressure from the brake pipe to atmosphere by flow via passage 26, chamber 62, passage 75, and thence past the unseated valve 69 to atmospheric chamber 68; and also an elongated annular cavity 148 provided in emergency slide valve 65 will connect a branch of passage 82 to an atmospheric vent port 149 for causing fluid under pressure to be released from control reservoir 11 by flow via passage 23, chamber 81, thence past the unseated protection valve 77, to the then vented passage 82, until control reservoir pressure is thus reduced to the illustrative 25 to 20 p.s.i., whereupon protection valve 77 will be seated by action of spring 83, as previously described, for terminating the release of control reservoir pressure.

Meanwhile, in service valve device 17, brake pipe pressure will be vented from chamber 24, causing the stack to shift the service slide valve 35 to its previously defined brake application position, in which the check valve 37 is unseated for admitting supply reservoir air to the passage 32 and pipe 34; and since, according to a feature of the invention, control reservoir pressure is concurrently being released from chamber 22, said slide valve will be shifted to its lap position, when fluid pressure in the pipe 34 and chamber 30 has increased to a value corresponding to the value of pressure retained in the control reservoir 11 and hence in chamber 22 by operation of the protection valve 77.

Meanwhile, some of the fluid thus supplied to passage 32 will cause prompt operation of the charging slide valve 50 to its cut-off position for preventing back flow of fluid from control reservoir 11 into the brake pipe passage 26 via choke 53. Each relay valve device 2 will operate, in the manner previously described, to provide in the corresponding brake cylinder device 106 fluid at a pressure either equal to the pressure of fluid thus established in pipe 34 (if the corresponding selector slide valve 119 is in its heavy load position) or at the chosen proportion, such as 60 percent, of such pressure in pipe 34 (if said valve 119 is in its light load position).

It will thus be noted that, according to a feature of the invention, the bias of spring 83 of protection valve device 60 is so selected, in relation to the effective area of diaphragm 79, as to retain in the control reservoir 11 fluid at a chosen pressure which will provide a desired brake cylinder pressure during an emergency application of brakes. Without this desirable arrangement, brake cylinder pressure would be excessive, due to the large differential that would then exist between the pressures in the control reservoir and the then vented brake pipe.

Meanwhile, pressure in quick action chamber 63 will blow down at the rate controlled by choke 64 into the chamber 62, which is then opened to atmosphere via the unseated vent valve 69. When pressure in chamber 63 has thus reduced to substantially that of atmosphere, emergency slide valve 65 will be shifted to its release position, in which it is shown, by pressure of spring 70 acting through the medium of movable abutment 61; whereupon vent valve 69 will be reseated by pressure of spring 72, for closing off the brake pipe from atmosphere. As soon as vent valve 69 has thus been seated, a release of the emergency brake applications may be initiated.

Releasing an emergency application of brakes

To release an emergency application of brakes, fluid under pressure is supplied to the brake pipe at the locomotive for restoring brake pipe pressure to its normal full charge value. If a locomotive brake apparatus of the aforementioned type is used, the handle of the aforementioned engineer's brake valve device should be moved to running position, rather than to release position; it being noted that control reservoir pressure was reduced during the emergency application to the chosen value corresponding to the selected bias of spring 83, and that movement of said handle to release position would therefore accomplish no useful purpose.

Some of the fluid under pressure thus applied to the brake pipe 10 at the locomotive will be supplied, on a particular car, to the chamber 62 of emergency valve device 58 and thence at the rate controlled by choke 64 to the quick action chamber 63 for recharging the latter; and some of such fluid will also be supplied to chamber 24 of service valve device 17 for causing such pressure in chamber 24, assisted by pressure in chamber 30 and spring 41, to shift the movable abutment stack promptly against resistance of control reservoir pressure then bottled up in chamber 22, thereby carrying the service slide valve 35 from its lap position to its brake release position, in which it is shown, for releasing fluid under pressure from the passage 32 and hence from chamber 30, pipe 34, and charging valve chamber 47. As pressure in pipe 34 is thus reduced, each relay valve device 2 will operate to correspondingly release fluid under pressure from the associated brake cylinder devices 106. When pressure in chamber 47 has reduced to the illustrative 1 p.s.i., the charging slide valve 50 will be shifted to its charging position, for causing the control reservoir 11 to be recharged with fluid from the brake pipe, initially via the fast charge choke 57 and past check valve 19 and later solely via the slow charge choke 53, as previously described in connection with quick release of a service application.

When brakes have been completely released following an emergency application, the various components will once again be conditioned as upon on completion of initial charging of the apparatus.

*Description and operation—Fig. 2*

If desired, the functions of the relay valve device 2 and service valve device 17 of Figs. 1A and 1B may be combined in a service valve device 150 which is adapted to provide two different braking ratios and is shown in Fig. 2. Where appropriate, like reference numerals have been used in Fig. 2 to designate parts which may be similar to those shown in Figs. 1A and 1B.

According to the embodiment shown in Fig. 2, one service valve device 150 and one selector valve device 3 are contained in a sectionalized casing 151 suitably mounted to a pipe bracket 152 that is preferably supported near each axle to be braked; said valve devices 150 and 3 being provided for controlling the degree of braking of the wheels associated with such axle. The emergency valve device 58, vent valve device 59, and protection valve device 60 are contained in a sectionalized casing 153 that is suitably mounted to the pipe bracket 7, to which is also mounted a casing 154 containing merely the charging valve device 18 and control reservoir charging check valve 19.

The service valve device 150 differs from the service valve device 17 of Fig. 1B in that a movable abutment 155 is interposed between the movable abutments 20, 21 and is positively connected to the movable abutment 21 through the medium of a coaxially arranged stem 156 and suitable screw-thread connecting means 157. The stem 156 has sealing, slidably guided contact with the wall of an aligned bore through a casing partition 158 separating atmospheric chamber 29 from a chamber 159 at one side of movable abutment 155, at the opposite side of which is an atmospheric chamber 160 defined in part by the casing partition 28. The pusher stem 27 at its respective ends bears against the movable abutments 155, 20 for providing a cooperative connection therebetween.

Chamber 22 of service valve device 150 is open via a passage 161 to a pipe 162 leading to control reservoir 11; chamber 24 is open via baffle choke 25 to a passage 163 leading to a branch of brake pipe 10; chamber 159 is open via a baffle choke 164 to a passage 165 leading to the bore within which selector slide valve 119 is slidably mounted; and chamber 30 is open via baffle choke 31 to a passage 166 also leading to said bore.

When air spring pressure, as noted via pipe 115 in chamber 113 of selector valve device 3, denotes a light load condition, the selector slide valve 119 will be biased by spring 116 to a light load position, in the manner previously described. However, according to this embodiment of the invention, when selector slide valve 119 is in light load position, cavity 122 connects passage 166 to atmospheric vent port 123 for venting chamber 30 of service valve device 150; and the inner end of said selector slide valve uncovers passage 165 to chamber 121, which is constantly open via a passage 167 and a brake cylinder application choke 168 to the pipe and passage 107 leading to corresponding brake cylinder devices 106 (not shown), for thereby opening chamber 159 of service valve device 150 to said brake cylinder devices. Other branches of the passage 167 lead to chamber 39 beneath the check valve 37 and to a pipe 169.

If this brake apparatus is used on a single-axle car of the type previously described, in which case only one service valve device 150 and selector valve device 3 will be used on such car, then the pipe 169 is connected directly to pipe bracket 7 for opening pipe 169 via a passage 170 in casing 154 to chamber 47 of charging valve device 18. If, however, this apparatus is employed on a two-axle car then the respective pipes 169 lead from the corresponding pipe brackets 152 to opposite ends of a double check valve device 171. This valve device 171 may be of any suitable type comprising valve means (not shown) operative to connect whichever one of these pipes 169 is charged with fluid at the preponderant pressure to a pipe 172 connected to passage 170; said valve means also being operative to prevent flow of fluid under pressure between said pipes 169. Thus, if the selector valve device 3 for one axle is in heavy load position and the valve device 3 for the other axle is in light load position, the valve device 171 will admit brake cylinder pressure from the brake cylinder pipe 107 associated with the more heavily loaded axle to the chamber 47 of charging valve device 18 for causing prompt operation of charging valve 50 to its previously defined cut-off position; and valve device 171 will also preventing the higher brake cylinder pressure developed for braking the more heavily loaded axle from equalizing with the lower brake cylinder pressure developed for braking the lightly loaded axle.

When air spring pressure as noted via pipe 115 in chamber 113 of selector valve device 3 denotes a heavy load condition, the selector slide valve 119 will be biased by such pressure to a heavy load position against resistance of the spring 116 in the manner previously explained. Under this condition, cavity 122 of valve 119 connects passage 165 to atmospheric vent port 123 for venting chamber 159 of service valve device 150; and valve passageway 142 connects passage 166 to passage 167 for opening chamber 30 of said service valve device to the brake cylinder pipe 107.

It will now be noted that, according to this embodiment, the selector slide valve 119 will either vent service valve chamber 30 and open service valve chamber 159 to the brake cylinder devices 106 or else vent chamber 159 and open chamber 30 to said brake cylinder devices, according to whether the particular axle is lightly or heavily loaded, as denoted by the air spring pressure necessary to maintain the car body at the aforementioned preselected height above said axle. The effective area of movable abutment 155 is greater than that of movable abutment 21; the ratio in such effective areas being so selected that the service valve device 150 will respond to a reduction in brake pipe pressure in chamber 24 relative to control reservoir pressure in chamber 22 to selectively provide a normal braking ratio or a chosen lesser braking ratio, such as 60 percent of normal, according to whether relay operation of the service stack and slide valve 35 is influenced by brake cylinder pressure as noted in chamber 30 or by brake cylinder pressure as noted in chamber 159, respectively.

Except in the respects above described, the various components of this embodiment of the brake apparatus will operate in the same manner as described in connection with the embodiment of Figs. 1A and 1B.

*Summary*

It will now be seen that both embodiments of the improved load-controlled brake apparatus are adapted for use on any railway car of the type wherein the car body 125 is maintained at a preselected constant height relative to the axle or axles 126 by suitable regulation of the pressure of fluid in an air spring device 4, which pressure thus indicates the load imposed on a particular axle. Both embodiments include novel arrangements whereby a selector valve device 3, controlled by air spring pressure, selects between a normal or a lesser braking ratio according to whether the load imposed on the axle exceeds or is less than a preselected value.

Both embodiments also include novel means whereby, whenever an emergency valve device 58 moves to an emergency position for effecting an emergency application of brakes, control reservoir pressure is reduced to a chosen value for causing the service valve device 17 or 150 to operate to provide a brake cylinder pressure of a magnitude corresponding to said chosen value of retained control reservoir pressure; it being noted that fluid is supplied to one or two pairs of brake cylinder devices 106 (according to whether the car is of the single-axle or two-axle type) from a supply reservoir 12 that is constantly maintained charged from a supply pipe 15 to a value preferably higher than the normal full charge value of brake pipe pressure. Also, with both embodiments, means are provided for effecting a reduction in control reservoir pressure to said chosen value promptly upon initiation of a quick, electro-pneumatic direct release of a service application of brakes.

According to the embodiment of Figs. 1A and 1B, the selector valve device 3 conditions a relay valve device 2 so that when fluid under pressure is supplied to a pipe 34 by operation of a service valve device 17, said relay valve device will operate to provide in a corresponding brake cylinder device 106 fluid at a pressure equal to, or a chosen proportion of, the pressure in pipe 34, according to whether the selector valve device is in a heavy load or a light load position.

According to the embodiment of Fig. 2, the functions of the service valve device 17 and relay valve device 2 are performed by a service valve device 150, which is conditioned by the selector valve device 3 to provide in a corresponding pair of brake cylinder devices 106 fluid at a pressure corresponding to a normal braking ratio or a chosen lesser braking ratio according to whether the selector valve device is in its heavy load or its light load position.

Having now described the invention, what we claim as new and desire to secure by Letters Patent is:

1. A load-controlled brake apparatus for a railway car, comprising, in combination, a normally charged brake pipe, air spring means, means for providing different fluid pressures at different times in said air spring means for causing the latter to support the car body at a preselected height relative to an unsprung member, a selector valve controlled by pressure of fluid in said air spring means and operative selectively to one position or another position according to whether such pressure exceeds or is less than a chosen value, a brake cylinder, a brake controlling communication, a control reservoir normally containing fluid at the normal charge value of brake pipe pressure, means operative to supply fluid under pressure to and release fluid under pressure from said communication according to the extent of reduction and restoration, respectively, of brake pipe pressure relative to control reservoir pressure, means variously conditioned according to position of said selector valve and operative to provide in said brake cylinder fluid at the pressure of fluid in said communication or at a chosen proportion of such pressure according to whether said selector valve is in its said one position or other position, a normally closed release communication through which fluid under pressure may be released from said control reservoir, means responsive solely to an emergency rate of reduction in brake pipe pressure to open said release communication, and protection valve means for limiting the degree of such release of control reservoir pressure via said release communication.

2. A load-controlled brake apparatus for a railway car, comprising, in combination, a normally charged brake pipe, air spring means, means for providing different fluid pressures at different times in said air spring means for causing the latter to support the car body at a preselected height relative to an unsprung member, a selector valve controlled by pressure of fluid in said air spring means and operative selectively to one position or another position according to whether such pressure exceeds or is less than a chosen value, a brake cylinder, a brake controlling communication, a control reservoir normally containing fluid at the normal charge value of brake pipe pressure, means operative to supply fluid under pressure to and release fluid under pressure from said communication according to the extent of reduction and restoration, respectively, of brake pipe pressure relative to control reservoir pressure, means variously conditioned according to positioning of said selector valve for causing fluid to be provided in said brake cylinder at the pressure of fluid in said communication or at a chosen proportion of such pressure according to whether said selector valve is in its said one position or other position, a normally closed release communication through which fluid under pressure may be released from said control reservoir, means electrically controlled from the locomotive and normally conditioned to close said release communication and adapted to be conditioned to open said release communication for so influencing operation of the above-recited means that controls fluid pressure in said brake controlling communication as to effect a quick direct release of pressure from said brake controlling communication, and protection valve means for limiting the degree of release of control reservoir pressure via said release communication.

3. A load-controlled brake apparatus for a railway car, comprising, in combination, a normally charged brake pipe, air spring means, means for providing different fluid pressures at different times in said air spring means for causing the latter to support the car body at a preselected height relative to an unsprung member, a selector valve controlled by pressure of fluid in said air spring means and operative selectively to one position or another position according to whether such pressure exceeds or is less than a chosen value, a brake controlling communication, a brake cylinder, a control reservoir containing fluid at the normal charge value of brake pipe pressure, means operative to supply fluid under pressure to and release fluid under pressure from said communication according to the extent of reduction and restoration, respectively, of brake pipe pressure relative to control reservoir pressure, means variously conditioned according to positioning of said selector valve and operative to provide in said brake cylinder fluid at the pressure of fluid in said communication or at a chosen proportion of such pressure according to whether said selector valve is in its said one position or other position, a normally closed release communication through which fluid under pressure may be released from said control reservoir to atmosphere, a release train wire normally deenergized and adapted to be energized under control of the operator at the locomotive, magnet valve means normally deenergized for closing said release communication and responsive to energization of said train wire to open said release communication, and protection valve means interposed in said release communication for retaining pressure in said control reservoir at a chosen minimum value when said release communication is opened.

4. A fluid pressure brake apparatus comprising, in combination, a normally charged brake pipe, a control reservoir normally containing fluid at the normal charge value of brake pipe pressure, a brake controlling communication, service valve means responsive to a reduction in brake pipe pressure relative to control reservoir pressure to cause fluid at a corresponding pressure to be provided in said brake controlling communication for causing an application of brakes and responsive to a subsequent increase in brake pipe pressure relative to control reservoir pressure to release fluid under pressure from said brake controlling communication for causing a release of brakes to a degree corresponding to the extent of such increase in brake pipe pressure, a normally closed release communication through which fluid under pressure may be released from said control reservoir, protection valve means interposed in said release communication for retaining fluid in said control reservoir at a chosen minimum value during release flow through said release communication, and valve means responsive to an emergency rate of reduction in brake pipe pressure to cause said brake pipe to be locally vented to atmosphere for causing an emergency application of brakes while also opening said release communication, whereby with said brake pipe vented said service valve means will operate during an emergency application of brakes to provide in said brake controlling communication fluid at a pressure corresponding to said chosen value of retained control reservoir pressure.

5. A fluid pressure brake apparatus comprising, in combination, a normally charged brake pipe, a control reservoir normally containing fluid at the normal charge value of brake pipe pressure, a brake controlling communication, a supply source other than said brake pipe containing fluid maintained at a substantially constant value of pressure, service valve means responsive to a reduction in brake pipe pressure relative to control reservoir pressure to supply fluid under pressure from said source to cause fluid at a pressure corresponding to the extent of such reduction to be provided in said brake controlling communication for causing an application of brakes and responsive to a subsequent increase in brake pipe pressure relative to control reservoir pressure to release fluid under pressure from said brake controlling communication while maintaining said brake controlling communication cut off from said source for causing a release of brakes to a degree corresponding to the extent of such increase in brake pipe pressure, a normally closed release communication through which fluid under pressure may be released from said control reservoir to atmosphere, protection valve means interposed in said release communication for retaining fluid in said control reservoir at a chosen minimum value during release flow through said release communication, and emergency valve means responsive to an emergency rate of reduction in brake pipe pressure to cause said brake pipe to be locally vented to atmosphere for causing an emergency application of brakes while also opening said release communication, whereby with said brake pipe vented said service valve means will operate during an emergency application of brakes to provide in said brake controlling communication fluid at a pressure corresponding to said chosen value of retained control reservoir pressure.

6. A fluid pressure brake apparatus comprising, in combination, a normally charged brake pipe, a control reservoir normally containing fluid at the normal charge value of brake pipe pressure, a brake controlling communication, a supply source other than said brake pipe containing fluid maintained at a substantially constant value of pressure, service valve means responsive to a reduction in brake pipe pressure relative to control reservoir pressure to supply fluid under pressure from said source to cause fluid at a pressure corresponding to the extent of such reduction to be provided in said brake controlling communication for causing an application of brakes and responsive to a subsequent increase in brake pipe pressure relative to control reservoir pressure to move to a release position to release fluid under pressure from said brake controlling communication to a degree corresponding to the extent of such relative increase in brake pipe pressure while maintaining said brake controlling communication cut off from said source for thereby causing a release of brakes, a normally closed release communication through which fluid under pressure may be released from said control reservoir to atmosphere, protection valve means interposed in said release communication for retaining fluid in said control reservoir at a chosen minimum value during release flow through said release communication, and electrically controlled means conditioned from the locomotive for energization and deenergization and normally conditioned for causing closure of said release communication but conditionable to cause opening of said release communication for causing said service valve means to move to and remain in release position for causing a direct complete release of brakes.

7. A fluid pressure brake apparatus comprising, in combination, a normally charged brake pipe, a control reservoir normally containing fluid at the normal charge value of brake pipe pressure, a brake controlling communication, service valve means responsive to a reduction in brake pipe pressure relative to control reservoir pressure to cause fluid at a pressure corresponding to the extent of such reduction to be provided in said brake controlling communication for causing an application of brakes and responsive to a subsequent increase in brake pipe pressure relative to control reservoir pressure to move to a release position to release fluid under pressure from said brake controlling communication for causing a release of brakes corresponding to the extent of such relative increase in brake pipe pressure, a normally closed release passage through which fluid under pressure may be released from said control reservoir, protection valve means normally permitting flow of fluid from said control reservoir to said release passage and responsive to a reduction in control reservoir pressure to a chosen value to prevent such flow, emergency valve means responsive to a reduction in brake pipe pressure at an emergency rate to cause the brake pipe to be locally vented to atmosphere and also cause said release passage to be opened to atmosphere for so influencing operation of said service valve means as to provide in said brake controlling communication fluid at a pressure corresponding to said chosen value of control reservoir pressure, electrically controlled means conditioned from the locomotive for energization and deenergization and normally conditioned for closing a branch of said release passage and conditionable to open said branch to release control reservoir pressure for causing said service valve means to move to and remain in release position for providing a direct complete release of a service application of brakes.

8. A load-controlled brake apparatus for a railway car comprising, in combination, a normally charged brake pipe, air spring means for supporting the car body relative to an unsprung member, means for providing fluid at different pressures at different times in said air spring means to cause the latter to maintain the car body in a preselected vertical position relative to the unsprung member, a brake cylinder, a control reservoir containing fluid at the normal charge value of brake pipe pressure, means defining two chambers, a selector valve device responsive to pressure in said air spring means less than a chosen value to one position for venting one of said chambers and opening the other of said chambers to said brake cylinder and responsive to an air spring pressure exceeding said chosen value to another position for venting said other chamber and opening said one chamber to said brake cylinder, and a brake controlling means of the differential relay type subject to pressures of fluid in said chambers and brake pipe acting in opposition to control reservoir pressure and responsive to a reduction in brake pipe pressure relative to control reservoir pressure to provide in said brake cylinder fluid at one proportionate value corresponding to the extent of such reduction or at a selected lesser proportionate value according to whether said one chamber or said other chamber is opened to said brake cylinder by said selector valve device.

9. A load-controlled brake apparatus for a railway car comprising, in combination, a normally charged brake pipe, air spring means for supporting the car body relative to an unsprung member, means for providing fluid at different pressures at different times in said air spring means to cause the latter to maintain the car body in a preselected vertical position relative to the unsprung member, a brake cylinder, a control reservoir containing fluid at the normal charge value of brake pipe pressure, means defining two chambers, a selector valve device responsive to pressure in said air spring means less than a chosen value to one position for venting one of said chambers and opening the other of said chambers to said brake cylinder and responsive to an air spring pressure exceeding said chosen value to another position for venting said other chamber and opening said one chamber to said brake cylinder, and a brake controlling valve device comprising valve means for controlling pressure of fluid in said brake cylinder and also comprising three coaxially arranged movable abutments of different effective areas cooperable as a stack for controlling operation of said valve means, said stack being subject to control reservoir pressure acting on the largest of said movable abutments in opposition to the combined effect of a light spring bias, brake pipe pressure acting on said largest movable abutment, pressure of fluid in said one chamber acting on the smallest of said movable abutments and pressure of fluid in said other chamber acting on the intermediate sized movable abutment, said stack being responsive to a reduction in brake pipe pressure relative to control reservoir pressure to so control operation of said valve means as to provide in said brake cylinder fluid at one proportionate value corresponding to the extent of such reduction or at a predetermined lesser proportionate value according to whether said selector valve device is in its said other position or its said one position, the ratio between the effective areas of said smallest and intermediate movable abutments determining the ratio between said proportionate value and lesser proportionate value.

References Cited in the file of this patent

UNITED STATES PATENTS

| | | |
|---|---|---|
| 976,000 | Schenck | Nov. 15, 1910 |
| 1,114,823 | Turner | Oct. 27, 1914 |
| 1,601,167 | Farmer | Sept. 28, 1926 |
| 1,887,702 | Thomas | Nov. 15, 1932 |
| 1,922,227 | Brecht | Aug. 15, 1933 |
| 1,935,808 | McCune | Nov. 21, 1933 |
| 2,068,342 | McClure | Jan. 19, 1937 |
| 2,150,576 | Bell | Mar. 14, 1939 |
| 2,165,999 | Farmer | July 11, 1939 |
| 2,173,928 | Borde et al. | Sept. 26, 1939 |
| 2,344,868 | Hewitt | Mar. 21, 1944 |
| 2,361,575 | Thompson | Oct. 31, 1944 |
| 2,691,420 | Fox et al. | Oct. 12, 1954 |

FOREIGN PATENTS

| | | |
|---|---|---|
| 1,103,700 | France | Nov. 4, 1955 |
| 800,683 | Germany | Nov. 27, 1950 |

OTHER REFERENCES

Instruction Pamphlet No. 5032, May 1929, published by Westinghouse Air Brake Company, Pittsburgh, Pa., Figure 41 and pages 58 and 59.